United States Patent [19]

Jackowski

[11] 4,073,540

[45] Feb. 14, 1978

[54] SEALED HUB CAP AND METHOD

[75] Inventor: Ronald A. Jackowski, Palatine, Ill.

[73] Assignee: Chicago Rawhide Manufacturing Co., Elgin, Ill.

[21] Appl. No.: 652,900

[22] Filed: Jan. 28, 1976

[51] Int. Cl.² .......................................... B60B 27/00
[52] U.S. Cl. ....................... 301/108 A; 301/108 TW; 308/36.1; 264/252; 156/73.4; 156/216; 285/222; 285/423
[58] Field of Search ................. 301/37 R, 37 P, 37 S, 301/37 H, 108 A, 108 S, 108 TW; 220/378; 277/207 A; 285/222, 286, 204, 201, 423; 264/248, 252; 29/509, 513; 156/73.1, 73.4, 196, 216; 308/36.1, 187.1, 187.2

[56] References Cited

U.S. PATENT DOCUMENTS

| | | | |
|---|---|---|---|
| 2,151,702 | 3/1939 | Ilg | 285/204 |
| 3,089,738 | 5/1963 | Steiner | 301/108 TW |
| 3,177,041 | 4/1965 | Isenbarger | 301/108 TW |
| 3,659,880 | 5/1972 | Goldsobel | 285/423 |
| 3,881,243 | 5/1975 | Bannon | 156/73.1 |

*Primary Examiner*—Robert B. Reeves
*Assistant Examiner*—H. Grant Skaggs
*Attorney, Agent, or Firm*—James T. FitzGibbon

[57] ABSTRACT

A hub cap assembly for vehicle axles which includes a rigid hub cap body with a sidewall portion and a radially inwardly directed flange having a window therein so that the lubricant level in the axle housing can be seen without removing the hub cap. The window is received by a flange having inner and outer axially directed surfaces and an inner edge defining an opening in the cap body. The window unit includes a transparent central panel and a mounting portion comprising first and second annular, generally axially extending window-mounting flanges which are spaced radially apart from each other so as to define an annular seal-receiving groove. One window-mounting flange has an axially facing end portion snugly received against the outer axially directed surface, and another window-mounting flange extends partly through the cap body opening. The other or second window-mounting flange includes a locking device with a part which snugly engages the inner axially directed surface of the flange. A seal ring is disposed in the seal-receiving groove, with the locking device and the first window-mounting flange engaging the inner and outer axially directed surfaces of said window-receiving flange respectively. This serves to compress the seal ring axially between a part of the groove and the outer axially directed flange surface, thereby establishing an oil-tight seal between the cap body and the window unit.

9 Claims, 8 Drawing Figures

SEALED HUB CAP AND METHOD

BACKGROUND OF THE INVENTION

The present invention relates to seals, and more particularly, to sealing methods and apparatus used to provide an oil-tight and water-tight seal in structures having transparent or nearly transparent window portions attached to a metal cap covering a sealed assembly, such as an axle bearing or the like.

Several years ago, an important breakthrough was made in the field of providing adequate lubrication to certain types of bearing assemblies, with the result that lubrication intervals were greatly extended, and also that the requirement for periodic maintenance was virtually eliminated. According to this concept, a novel so-called unitized seal was placed within a bearing and axle assembly of the type used on large trucks, tractors, semi-trailers, etc. The novel seal, a typical form of which is shown in U.S. Pat. No. 3,086,781, enabled a relatively low viscosity ("light weight") oil, such as a motor oil (SAE No. 30, for example) to be used in lubricating the bearings instead of the grease formerly used. The bearings in question were typically of the tapered roller configuration, and were in fact better lubricated by grades of oils which were then much lighter or less viscous than the greases previously used.

With the use of heavy grease on wheel bearings of this type, it was necessary to remove the bearings periodically and repack them with the grease. Because grease is not nearly as fluid as oil, and in some cases is not really a fluid at all, continued rotation of the bearings serve gradually to squeeze the grease outwardly from the rollers and bearing races, necessitating periodic repacking. Still further, it is not possible to inspect a bearing using grease from a distance to determine whether it should be re-greased, and accordingly it is the practice with this type of bearing to remove it and pack it periodically, whether or not such repacking is actually necessary.

It will be understood that a common type of bearing failure resulting from lack of lubrication causes bearing seizure, which can in turn cause a vehicle road wheel to be locked to the axle. This commonly results in an accident involving the vehicle, and accordingly, periodic greasing of bearings, being dangerous if neglected, was a very important aspect of vehicle fleet maintenance. Needless to say, considerable cost and labor are involved in disassembling and repacking the bearings in large truck and trailer wheels, with this inherently high cost being further magnified as the cost of labor increases.

With the advent of the unitized wheel seal of the type just described, it became possible to lubricate the wheel bearings with a relatively thin oil, thereby providing not only better lubrication, but lubrication which, because of the high fluidity of the oil, is inherently being constantly replenished at the working surfaces of the bearings. Using this development, it is only necessary to insure that an adequate lubrication level is maintained within the axle housing, and this, according to the invention just referred to, was made possible by providing a transparent cap or cover for the heavy steel hub cap affixed to the end of the axle housing and covering the end of the axle, the axle nut, etc. By using seals of the type described and using hub caps with transparent windows, it is only necessary to look through the window periodically to see that adequate lubricant is present. If so, no maintenance is required, and if the lubricant level is low, a removable plug in the window is removed and additional oil is added. When it is desired to change this oil, which is done only at extended intervals, if at all, it is still not necessary to disassemble the wheel and axle assembly.

As may be expected, making a hub cap having a suitably transparent window was a significant industry problem; this was overcome, however, by using extremely tough but transparent material such as polycarbonate plastics ("Lexan") for example. Plastic materials such as this possess the oil resistance as well as the physical strength necessary to avoid breakage during conditions commonly encountered in heavy duty trucking. Patents showing such hub caps include U.S. Pat. Nos. 3,316,022, 3,177,041 and 3,114,579.

However, there still exists a problem of forming a proper secondary seal between the inner margins of the hub cap defining the window opening and the window itself, and these problems were rendered more difficult to overcome as certain industry, government, and other test standards were adopted, which standards call for exposing the cap and window assemblies to extreme variations of temperature. Accordingly, there has been a significant need for improvement in the effectiveness and reliability of this seal. As appears elsewhere herein, this seal occurs at an interface where at there is considerable differential thermal expansion, distortion, and the like. An ideal seal of this type is one which is easy and reliable to make, which is oil-tight, which is permanent, and which permits significant as well as continual radial expansion and contraction.

Accordingly, it is an object of the present invention to provide an improved secondary seal and method for the foregoing use.

Another object is to provide an improved metal-to-plastic seal which permits significant expansion and contraction in use.

Another object is to provide an improved seal for specialty hub caps and an improved method of making such a seal.

Another object is to provide a hub cap seal which will be highly effective without requiring machining or other special formation of the metal components of the hub cap.

Another object is to provide a specialty seal which includes a metal portion, a plastic portion received within a central opening in the metal portion and which includes an annular groove, a rubber seal member receiving within the groove and a flange locked over the inner margin of the metal cap element so as to apply an axial force to the seal member.

The foregoing and other objects and advantages are achieved in practice by providing a rigid hub cap member, a transparent central window received within an aperture in said cap, means defining a seal receiving groove in the cap, an axially compressible seal member within the groove, and a flange forming a part of the window and extending within the aperture, with the flange being constructed and arranged so as to exert an axial compressive load on the seal member, compressing it between a part of said groove and an inner margin of said cap adjacent said aperture.

The manner in which the foregoing and other objects are carried into practice will become more clearly apparent when reference is made to the following detailed description of the preferred embodiments of the invention set forth by way of example and shown in the ac-

DESCRIPTION OF THE PREFERRED EMBODIMENTS OF THE INVENTION

Figure 1:
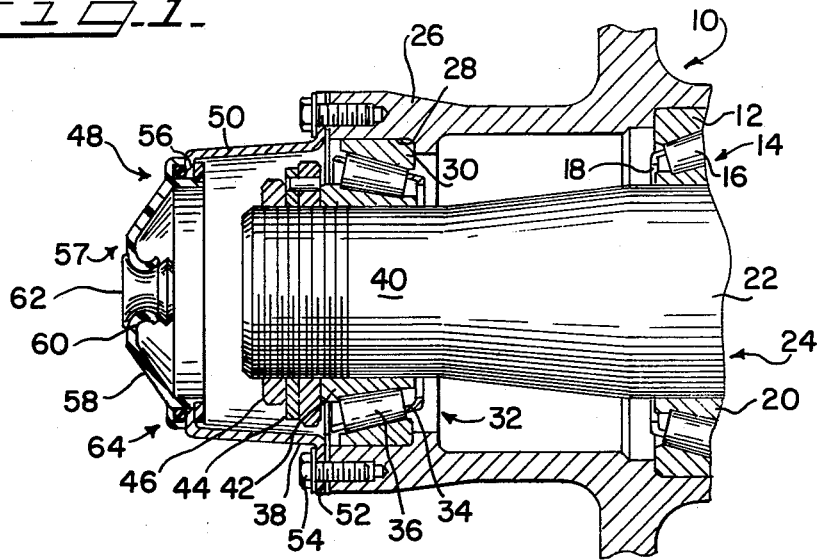
FIG. 1 is a vertical sectional view of the end portion of a vehicle axle and bearing support assembly, including a hub cap containing the seal of the invention.

Although the invention is capable of a number of applications, and may be used in somewhat different environments, a description thereof will be made of a form of the invention in which a hub cap assembly is used to cover a rotary hub and wheel assembly journaled for rotation on a stationary shaft by a pair of friction-reducing bearings. In the description and in the claims, it will be understood that expressions such as "inner" and "outer" apply to the hub cap in its position of use, that is, with the interior being the portion which receives and holds the oil to lubricate the bearings.

Referring now to the drawings in greater detail, there is shown a rotatable wheel hub generally designated 10 pressed over the radially outer race 12 of an axially inner assembly 14 which includes a plurality of tapered bearing rollers 16 located by a cage 18. An inner bearing race 20 is snugly received over an enlarged diameter portion 22 of the stationary axle shaft generally designated 24. A forwardly extending flange 26 of the hub 10 includes a counterbored portion 28 receiving the outer race 30 of an axially outer bearing assembly 32, which further includes a cage 34 locating a plurality of tapered rollers 36. The inner race 38 of the outer assembly 32 is pressed over a reduced diameter end portion 40 of the shaft 24.

The desired axial preload is placed on the bearings by inner and outer spacers and retainers 42, 44 secured in place by an adjusting nut 46. The housing formed by the interior of the hub 10 is closed off at the outer end by a hub cap assembly generally designated 48 and shown to include a stiff metal or like body portion 50 having a hub-engaging mounting flange 52 fastened, as by cap screws 54, to the outer end portion 26 of the hub 10 in this embodiment, openings (not numbered) in the flange 52 serve to cooperate with the cap screws 54 to provide means for locking the hub cap body 50 onto the hub 10.

Disposed on the axially outer end of the metal body portion 50 opposite the mounting flange 52 is an inturned, generally radially extending, window mounting flange 56. The window assembly, generally designated 57, includes a main, oil level-viewing panel 58, and may also include an inturned central margin 60 forming means for removably receiving a vented rubber plug 62. The plug 62, the function of which is to permit "breathing" of the sealed region, as well as ready removability for refilling the housing with lubricant, may be of the type shown and described in the hub cap patents referred to elsewhere herein.

Figure 2:
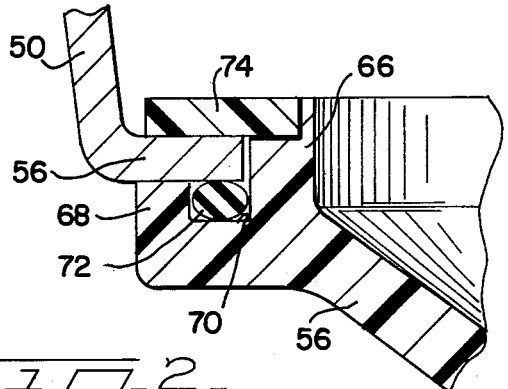
FIG. 2 is an enlarged sectional view of a portion of the hub cap shown in FIG. 1 and showing the constructional details of a part of the hub cap embodying the seal of the invention.

Lying radially outwardly of the panel 58 is the mounting portion 64 of the window assembly 57. By reference to FIG. 2, it will be seen that the mounting assembly 64 includes a generally axially extending, radially inner locating flange 66, an outer, travel-limiting flange 68 extending parallel to the flange 66 and spaced therefrom by a groove 70 receiving an annular elastomeric seal member 72 therein. A locking ring 74 is permanently joined to the axially inner end portion of the flange 66 in such a manner that its radially inner margin overlies the end face of the locating flange 66 and also such that it lies generally opposite the end face of the flange 68. FIG. 2 shows that the elastomeric seal member 72 is in the form of an O-ring which, in the installed or assembled position, is distorted into a somewhat flattened, generally elliptical cross-sectional shape.

When the seal is formed as shown in FIGS. 1 and 2, the locking ring 74 exerts sufficient axial load on the seal ring 72 so that it remains substantially compressed. The axial end face of the flange 68 is snugly received against the window mounting flange 66, while the outer diameter of the axial flange 66 is spaced radially inwardly somewhat apart from the inner edge of the metal flange 56. When the assembly is heated and cooled, thermal expansion will cause the dimensions of both the plastic and the metal parts to change at different rates, and the provision of the clearance just described insures that there will be no damage or strain to the plastic part. Moreover, the provision of the clearance space reduces the need that the pierced opening in the end of the cap body defined by the inner edges of the flange 66 be exactly circular and free from burrs or rough edges. Because, unlike prior art designs, these mutually opposed surfaces are not relied upon to create a static seal, there is no need to perform numerous finishing operations thereon.

The shape of the seal ring 72 permits a limited amount of movement between the bottom of the groove 70 and the oppositely directed face of the flange 56, as occurs during thermal expansion and contraction. Contact between the face of the flange 68 and the surface 56 excludes dirt from contacting the seal ring 72.

Figure 3:
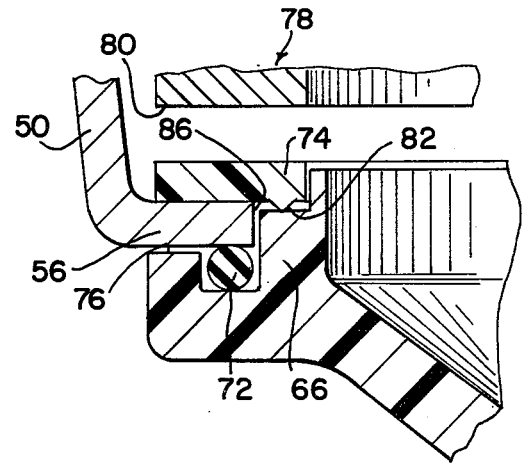
FIG. 3 is a vertical sectional view of a part of the hub cap of FIG. 2, showing the manner of forming the seal of the invention and showing one form of tool used for this purpose.

Referring now to FIG. 3, a method of forming this seal is illustrated. According to this method, the transparent cap unit is made from a relatively rigid, shock resistant thermoplastic material such as a polycarbonate plastic. This material affords fairly good optical clarity and is quite transparent.

The metal body 50 of the hub cap assembly 48 is supported by suitable means in the position shown in FIG. 3, which is a position rotated 90° counterclockwise from its position shown in FIG. 1.

The window portion 57 is disposed with the mounting portion disposed upwardly and the flange 66 is inserted axially into the opening defined by the inner edges of the flange 56. The locking ring 74, which is constructed of the same plastic material, is placed inside the metal cap 50 and positioned with its outer margin overlying the inner margin of the flange 56. An annular pointed tip 82 extends axially outwardly from the ring 74. This tip concentrates the ultrasonic energy and is the first material to melt and form the bond during ultrasonic welding. At this point, the end portion 76 of the window flange 68 is spaced somewhat apart from the cap body flange 56, and the O-ring seal 72 is of a round cross section, with its axial inner and outer surfaces engaging respectively the outside surface of flange 56 and the bottom surface of the groove 72. The outer surface of the flange 66 serves as a pilot diameter or guide to aid in centering the window assembly 57 in the opening in the flange 56.

An ultrasonic welding tool 78 having a generally flat, radially directed end face 80 is disposed just above the locking ring 74. Next, the ultrasonic welding tool 78 is pushed downwardly toward the window assembly 57 (which is resting upon a holder) to take up the axial space between the end 76 of the flange 68 and the flange 56 on the cap body 50, thus placing the O-ring seal 72 in compression, as shown in FIG. 4.

Next, the welding tool is brought into close contact with the locking ring, a further axial force is exerted, the tool is actuated, and an ultrasonic weld is formed, with the tip 82 melting and flowing along the generally L-shaped juncture at which the locking ring 74 meets the flange 66. The axial pressure is retained for a short period for the weld thus formed to cool sufficiently to solidify.

The measurable radial gap between the radially outer margin 84 of the axial flange 66 and the radially inwardly directed edge 86 of the flange 56 is provided for the reasons referred to above; however, the size of this gap is sufficient to rule out use of the previous practice of merely snap fitting the window covers or panels into the metal part of the hub cap.

Figure 4:
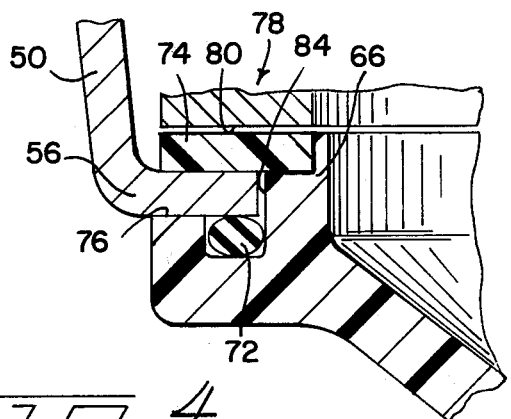
FIG. 4 is a view similar to that of FIG. 3, but showing a subsequent step in the seal forming process.

As will be noted from FIGS. 2 and 4, for example, because the axially inner edge 76 of the flange 68 tightly engages the flange 56, the O-ring 72 is confined against any possible radially or axially outward movement. This is an important feature of the invention, because the rubber seal cannot be displaced outwardly as a result of pressure buildup within the housing containing the oil. In this connection, it will be understood that the locking ring 74 mechanically retains the window 57 in position, but does not necessarily provide a seal which is gas- and oil-tight. The O-ring not only provides such a seal, but, in constructions made according to the invention, the O-ring cannot escape or move to a position in which it is more lightly loaded and therefore, effective sealing is maintained during a wide range of temperatures (minus 30° or less up to 250° F or more).

Figure 5:
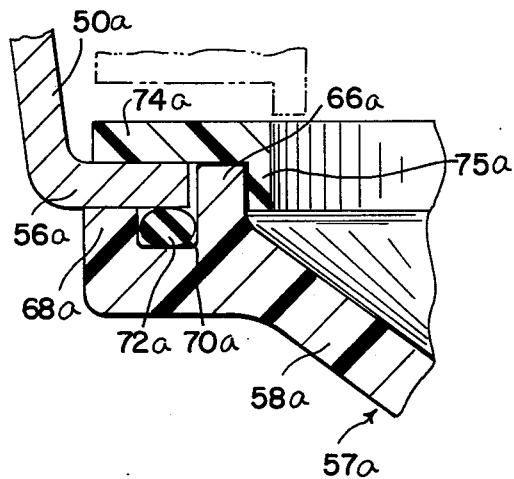
FIG. 5 is a vertical sectional view of another form of hub cap seal made according to the invention.

Referring now to FIG. 5, a seal construction generally resembling that of FIGS. 1-4 is shown, with the construction of FIG. 5 differing therefrom somewhat in detail. In FIG. 5, the metal cap body 50a includes the window mounting flange 56a, and the window 57a includes the main panel 58a as well as flanges 66a, 68a defining the groove 70a for receiving the annular ring 72a. However, in FIG. 6, the axial flange 66a has an end portion which is rectangular in cross section rather than having a notch or cut out therein. The two-surface ultrasonic weld is made along the area indicated by the inverted L-shaped heavy black line. The locking ring 74a is fitted with a shoulder 75a received within the inside diameter of the flange 66a. In making this construction, an ultrasonic welding tool having a generally L-shaped cross section is received over the inner surface of the locking ring 74a and within the inner diameter of the shoulder 75a, and a weld is formed when the tool is activated. One form of suitable tool is shown in phantom lines in FIG. 5.

Figure 6:
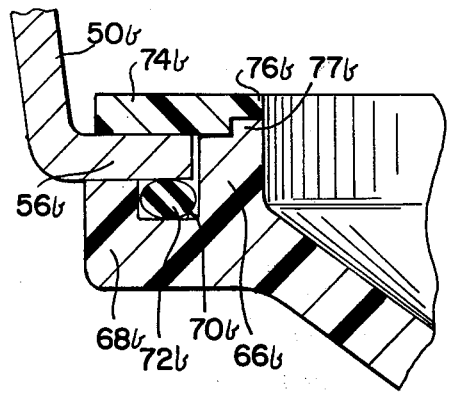
FIG. 6 is a vertical sectional view of still another form of seal made according to the invention.

Referring now to FIG. 6, a slightly modified form of the seal shown in FIGS. 1-4 and FIG. 5 is shown. In this embodiment, the flanges 50b, 56b are present as is the groove 70b lying between the flanges 66b, 68b and containing the annular seal 72b. In FIG. 6, however, the locking ring 74b includes a reduced thickness inner section 76b, and a shoulder 77b is formed on the axially inner end of the flange 66b. Accordingly, the ultrasonically formed weld lies along a surface which is stepped in cross section and which presents a substantial bonding surface.

Figure 7:
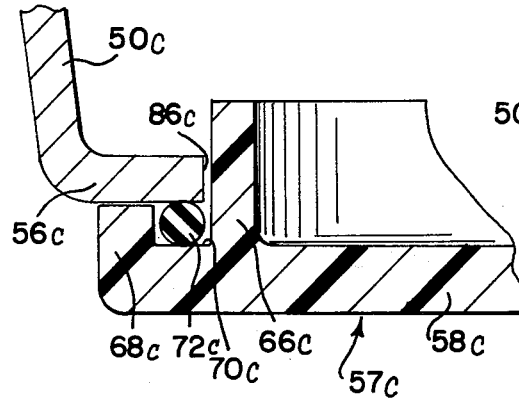
FIG. 7 is a vertical sectional view showing the components of another form of seal embodying the invention, such components being shown before assembly thereof.
Figure 8:
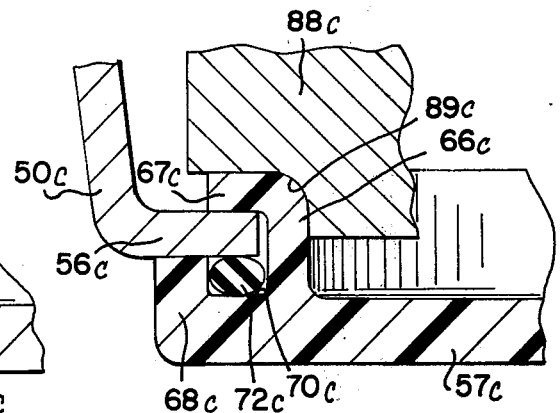
FIG. 8 is a vertical sectional view illustrating a subsequent step in the process of making a seal using the components shown in FIG. 7.

Referring now to FIGS. 7 and 8, another form of seal and a somewhat different method of making it are shown. In the embodiment of FIG. 7, the window 57c has a flat, central panel 58c which is raised above the surface of flange 56c as little as possible. As in the other embodiments, the flanges 66c, 68c define a groove 70c receiving an annular seal 72c. To assemble the window unit 57c to the metal body 50c of the cap, the window 57c is supported firmly, the body 50c is disposed thereover such that the flange 66c extends upwardly through the opening defined by the inside diameter 86c of the flange 56c. Thereupon, an ultrasonic heating and forming tool, such as the mandrel 88c, is engaged with the axially inner edge of the flange 67c, the mandrel is moved axially outwardly, and the curved surfaces 89c in the mandrel form a radially outwardly extending locking rim 67c thereon in such a manner as to seal the window assembly 57c against further movement and to compress the O-ring 72c. In the finished construction, the locking rim 67c serves the purpose of the locking ring 74, 74a, etc. in the other embodiments. However, it is formed in a different manner by a slightly different method. The form of hub cap assembly using the flat or flush type central panel 58 is used in applications wherein wide axle trucks and trailers are employed and wherein the axle hubs are constructed to within a small fraction of an inch of the legally permissible width. In such cases, the over-all additional width of 2 to 4 inches occasioned by the use of the cap shown in FIGS. 1-6 would not be legally permissible. In axles which are more narrow, the domed or dished form of plastic cap may be preferred as being somewhat stiffer and/or as having slightly greater capacity.

It has been found that caps made according to the present invention are very easy to manufacture, and that they avoid the difficulties met by other attempts to solve this problem. For example, attempts to form an O-ring seal and dispose it in a surface which is subject to radial dimensional change were not successful. Attempts to machine, roll, or cut a suitable groove in a surface so as to locate therein an O-ring having a radially directed sealing surface were unsuccessful, not only from the standpoint of costs, but because of assembly difficulties and seal leakage at one extreme of temperature and buckling at the other. Attempts to place an O-ring in a groove having a radial opening rather than an axial opening were likewise not successful.

Other attempts to create a seal, such as the use of various adhesives, were also not only functionally unsuccessful, but were difficult to apply economically, accurately and repeatably. Such attempts included the use of silicone rubber adhesives, etc. All adhesives tried, were either unable to stand the movement caused by expansion and contraction, or difficult to bond, and were affected by the pressure buildup within the housing. Still other constructions were subject to abrasion or did not provide the mechanical stability necessary to permit removal and replacement of the rubber plug.

However, the seal of the invention is able to provide a seal which may be firmly locked in place, and yet provides a seal which is unaffected by repeated physical movement occasioned by thermal cycling.

It will be thus seen that the present invention provides a new and useful seal and method having a number of advantages and characteristics including those pointed out herein and others which are inherent in the invention.

A number of illustrative embodiments having been described by way of example, it is anticipated that certain variations of the seal and method will occur to those skilled in the art and it is anticipated that such changes and variations may be made without departing from the spirit of the invention and the scope of the appended claims.

What is claimed is:

1. A hub cap assembly comprising, in combination, a rigid hub cap body having a generally axially extending sidewall portion, a radially outwardly extending mounting flange formed on one axial end of said sidewall, means on said mounting flange for accommodating a cap fastener, and a radially inwardly extending, window-receiving flange portion, said window-receiving flange portion including inner and outer axially directed surfaces and an inner edge defining an opening in said body, a window unit including a transparent central panel and a mounting portion comprising first and second annular, generally axially extending window-mounting flanges being spaced radially apart from each other so as to define therebetween an annular seal-receiving groove, said first window-mounting flange having an axially facing end portion snugly received against said outer axially directed surface, and said second window-mounting flange having a portion extending through said body opening, and said second window mounting flange having a portion extending through said body opening and having at least two surfaces lying in different planes, thereby forming a shoulder for receiving and locating a locking ring, a generally annular locking ring having a generally radially extending outer portion snugly engaging said inner axially directed surface and having a radially inner portion bonded to said shoulder forming portion of said second window mounting flange along said at least two surfaces forming said shoulder, and a seal ring disposed in said seal-receiving groove, said outer portion of said locking ring and said first window-mounting flange cooperating to compress said seal ring axially thereof between a portion of said groove and said outer axially directed surface, and thereby establishing an oil-tight seal between said cap body and said window unit.

2. A hub cap assembly as defined in claim 1 wherein said window is formed from a polycarbonate plastic material.

3. A hub cap assembly as defined in claim 1 wherein said transparent central panel is in the form of an axially outwardly extending dome.

4. A hub cap assembly as defined in claim 1 wherein said transparent central panel is in the form of a flat panel.

5. A hub cap assembly as defined in claim 1 wherein a filler plug is removably positioned generally centrally of said transparent central panel.

6. A hub cap assembly as defined in claim 1 wherein said bond is formed by ultrasonic welding of two thermoplastic materials to each other.

7. A method of forming a seal in a hub cap assembly, said method including providing a rigid hub cap body having a generally axially extending sidewall portion and a radially inwardly extending, window-receiving flange portion having inner and outer axially directed surfaces and an inner edge defining an opening in said body, providing a window unit having a transparent central panel and a mounting portion comprising first and second annular, generally axially extending window-mounting flanges spaced radially apart from each other and defining therebetween an annular seal receiving groove, positioning a seal ring within said seal receiving groove, positioning said window unit such that the axial end face portion of said first window-mounting flange snugly engages said outer axially directed surface, such that said seal ring is compressed between a portion of its receiving groove and said outer surface, and such that a portion of said second window-mounting flange extends axially through said opening, and ultrasonically deforming said portion of said second window-mounting flange radially outwardly into a position of snug engagement with said inner axially directed surface.

8. A method of forming a seal in a hub cap assembly, said method including providing a rigid hub cap body having a generally axially extending sidewall portion and a radially inwardly extending, window-receiving flange portion having inner and outer axially directed surfaces and an inner edge defining an opening in said body, providing a window unit having a transparent central panel and a mounting portion comprising first and second annular, generally axially extending window-mounting flanges each having an axially inner end, said window-mounting flanges being spaced radially apart from each other and defining therebetween an annular seal receiving groove, positioning a seal ring within said seal receiving groove, positioning said window unit such that the axial end face portion of said first window-mounting flange snugly engages said outer axially directed surface, such that said seal ring is compressed between a portion of its receiving groove and said outer surface, and such that a portion of said second window-mounting flange extends axially through said opening, positioning a locking ring such that the inner margin thereof overlies said axially inner end of said second window-mounting flange, and such that the radially outer portion thereof snugly engages said inner axially directed surface of said window-receiving flange, and forming a welded bond between said locking ring and said second flange while said locking ring and said window unit are so positioned.

9. A hub cap assembly comprising, in combination, a rigid hub cap body having a generally axially extending sidewall portion, a radially outwardly extending mounting flange formed on one axial end of said sidewall, means on said mounting flange for accommodating a cap fastener, and a radially inwardly extending, window-receiving flange portion, said window-receiving flange portion including inner and outer axially directed surfaces and an inner edge defining an opening in said body, a window unit including a transparent central panel and a mounting portion comprising first and second annular, generally axially extending window-mounting flanges being spaced radially apart from each other so as to define therebetween an annular seal-receiving groove, said first window-mounting flange having an axially facing end portion snugly received against said outer axially directed surface, and said second window-mounting flange having a portion extending through said body opening, the axial end portion of said second window-mounting flange being deformed radially outwardly so as to form generally radially extending locking means snugly engaging said inner axially directed surface of said window-receiving flange, and a seal ring disposed in said seal-receiving groove, said locking means and said first window-mounting flange engaging respectively said inner and outer axially directed surfaces of said window-receiving flange, thereby compressing said seal ring axially thereof between a portion of said groove and said outer axially directed surface, and thereby establishing an oil-tight seal between said cap body and said window unit.

* * * * *